(No Model.)
J. EARLE.
PENMANSHIP GUIDE.
No. 472,751. Patented Apr. 12, 1892.
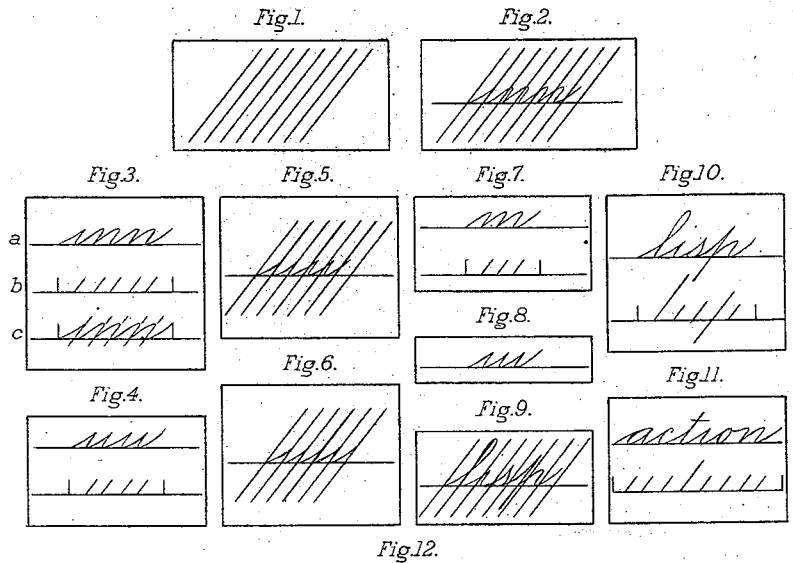
Witnesses
E. J. Nottingham
G. F. Downing
Inventor
John Earle
By H. A. Seymour
Attorney

UNITED STATES PATENT OFFICE.

JOHN EARLE, OF PRIMOS, PENNSYLVANIA.

PENMANSHIP-GUIDE.

SPECIFICATION forming part of Letters Patent No. 472,751, dated April 12, 1892.

Application filed March 4, 1891. Serial No. 383,761. (No model.)

*To all whom it may concern:*

Be it known that I, JOHN EARLE, a citizen of Primos, in the county of Delaware and State of Pennsylvania, have invented certain new and useful Improvements in Penmanship-Guides; and I do hereby declare the following to be a full, clear, and exact description of the invention, such as will enable others skilled in the art to which it appertains to make and use the same.

My invention relates to an improvement in penmanship-guides.

Aside from simple imitation of the copy by the pupil, there are but two methods of instruction employed by the makers of school textbooks of penmanship. One method furnishes a minute description of the parts and proportions of each letter, and this analytical dissection is to be committed to memory by the pupil. The other method consists in printing duplicates of the engraved copy below such copy, usually in a pale colored ink, and in having the pupil trace or follow these repetitions of the copy with a pen or pencil. The first method is too abstract to be clearly comprehended by children and is contrary to natural methods of instructions. The rules may be of use to the professional penman or to the engraver, but they are of no practical value to a child learning to write. The second method is purely mechanical. The child if careless writes over the printed forms in a slovenly manner without properly covering the strokes which have been studiously located by the engraver, without acquiring a habit of making correct forms, and probably without even considering what letters or words he is writing or rather attempting to trace. If the child is conscientious in his work the task becomes a painful one. There is no freedom or ease of movement. The exercise becomes one in drawing rather than in writing, and is a laborious effort to mechanically cover a meaningless combination of lines. There is no action of the brain in an endeavor to intelligently reproduce forms. The result is apt to be stiff and constrained and the fingers become cramped.

My invention consists in introducing below the engraved copy and upon the horizontal line upon which the pupil is to write a series of oblique lines at an angle corresponding to what is technically known in penmanship as the "main slant," these lines being made to correspond with the letters of the copy in such suitable positions as to give the pupil a practical guide to the height and width of each letter or part thereof, together with the proper spaces between letters or words. These lines are not continuous from top to bottom of a page. On the contrary, the length of each line is a guide to the extent of a particular letter or character or to some part thereof above or below the writing-line. The lines are not necessarily equidistant, in fact they are most likely to be at unequal distances from one another because letters and their combinations vary in their proportions and in their relative distances from one another; but each series of slant lines represent a particular character or combination and may not properly represent any other. By following this method the pupil acquires a practical knowledge of just those facts which the abstract analysis endeavors to convey and without burdening his mind with a mass of technical phraseology which is unintelligible to all except experts and persons skilled in the art of penmanship. On the other hand he acquires this knowledge in an intelligent effort to form each character or combination. His perception is not made dull by tracing as an automaton the work of another. He imitates the original copy, and at the same time must at least approximate to a correct reproduction of it if he follows the guidance which the oblique lines afford. His teacher may be thoroughly versed in the theory of correctly forming the letters, and yet it is possible for the pupil without any theoretical knowledge to acquire an actual habit of writing which may be more perfect than that of his instructor.

I am aware that continuous equidistant slant lines have been used for convenience in indicating the proper slant or slope of letters, and I make no claim to such a device. It is obvious that such lines cannot indicate the height of a letter, and being equidistant they can only by accident be of any service in showing the width of a letter or the relative positions of letters in combination.

I am aware, also, that slant lines have been used in illustrative diagrams to represent by uniform spaces the proportions of single letters or to exemplify by similar means a descriptive statement of the theory of spacing; but in every case such slant lines have been used to indicate width only, and I know of no instance in which lines arranged in the manner I have described have been used to indicate at once the height and the width of letters and their relative positions when combined. A series of slant lines marking the height, width, and relative positions of the component parts of a particular copy and designed to accompany the copy as a guide to the pupil in reproducing it in the actual exercise of writing has never, to my knowledge, been employed.

A few examples will illustrate the working of my method and show also in what respect the ordinary arrangement of continuous equidistant slant lines would be unavailing.

In Figure 1 of the accompanying drawings is a series of continuous slant lines, equidistant and separated from one another by the width of the main part of the letter "u" or by what is technically known in penmanship as "one space." In this figure the length of these lines is limited; but when actually used as a guide in writing they usually extend from the top to the bottom of a page.

Fig. 2 represents the application of such a system of lines to display the proportions and relations of the component parts of the word "inn." The letter "i" starts on one of the slant lines; but none of the other strokes in the word coincide with the equidistant slant-lines. It is obvious, therefore, that the proper relationship between the letters of this word cannot be expressed by a series of equidistant slant lines.

Fig. 3 illustrates my method of representing the same word. *a* is the copy. *b* is the arrangement of slant lines, indicating at once the height, the width, and the position of each letter. *c* represents a line arranged like *b*, over the slant lines of which the letters have been formed. To show that the letters coincide with the slant lines, the latter are, merely for the sake of illustration, extended above and below the letters.

Fig. 4 represents two "u's" properly combined, and below them the slant lines as I arrange them to indicate the proportions.

Fig. 5 represents the equidistant slant lines applied to the same combination. The first "u" coincides with the slant lines, but the second does not. This departure from the equidistant lines is caused in this instance, and in Fig. 2 also, by the fact that a greater distance is required between two letters than the standard distance between the two strokes of the "u" or the "n." This fact may be illustrated inversely. If, as in Fig. 6, the attempt were made to cause the two "u's" to conform to the equidistant slant lines, an uncertainty would exist as to whether the combination represented two "u's," four "i's," "i i u," "i u i," or "u i i;" or if three equidistant lines, which in Fig. 7 indicate the parts of the letter "m," be used, as in Fig. 8, to represent a combination of the letters "u" and "i" it becomes impossible to decide which of the two letters precedes the other. In other words, the combination in Fig. 6 or in Fig. 8 are merely successions of strokes, and the proper relationship of letters cannot be shown by equidistant slant lines.

In Fig. 9 the equidistant lines fail, as before, to show the width or relationship of the letters, and as each of the letters is of different height it must be clear that these slant lines furnish no clew to the distance which each letter extends above or below the line upon which the letters rest, whereas all these facts are indicated by my arrangement in Fig. 10.

In simple letters composed of downstrokes, as in "i," "u," or "n," the slant lines which I use show the position of these strokes. In letters composed wholly or partly of curved lines I employ the slant lines to indicate either the limits of the curve or its main axis, as may be most suitable. This is illustrated in the case of the "S" in Fig. 10 or in the "a," "c," and "o" in Fig. 11.

The examples already given illustrate my method, and I add another in Fig. 12 as a more elaborate sample of my arrangement. In this case letters are combined in words and the words in a group or sentence. The two lower lines indicate the arrangement of the slant lines for use by the pupil. The second line illustrates such a series of slant lines after the letters have been formed by the pupil. As in Fig. 3, the slant lines are here made to extend above and below the letters, in order that it may be at once apparent that the letters have been properly located. Such a copy would be given to an advanced pupil who had received proper training from experience in forming more simple combinations.

Having fully described my invention, what I claim as new, and desire to secure by Letters Patent, is—

In a penmanship-guide, the combination, with a sheet or leaf and a copy to be reproduced, of a series of slanting lines arranged on said sheet or leaf, said slanting lines being arranged in such manner as to mark the height and slant of the letters and parts of letters of the copy and also the relative position of the component parts of the letters of the copy on the sheet or leaf, said slanting lines serving as a guide to the pupil in forming the letters, substantially as set forth.

In testimony whereof I have signed this specification in the presence of two subscribing witnesses.

JOHN EARLE.

Witnesses:
 EDWD. RAMSEY,
 ALEX. RAMSEY.